United States Patent
Lawin

(10) Patent No.: US 8,036,528 B2
(45) Date of Patent: Oct. 11, 2011

(54) DATA TRANSMISSION UNIT FOR HIGH BIT-RATE SIGNALS, ESPECIALLY HIGH BIT-RATE OPTICAL DATA SIGNALS GREATER THAN 1 GBIT/S

(75) Inventor: Mirko Lawin, Meiningen (DE)

(73) Assignee: ADVA AG Optical Networking, Meiningen (DE)

( * ) Notice: Subject to any disclaimer, the term of this patent is extended or adjusted under 35 U.S.C. 154(b) by 708 days.

(21) Appl. No.: 12/112,372

(22) Filed: Apr. 30, 2008

(65) Prior Publication Data

US 2008/0267636 A1 Oct. 30, 2008

(30) Foreign Application Priority Data

Apr. 30, 2007 (DE) .......................... 10 2007 020 661

(51) Int. Cl.
*H04B 10/08* (2006.01)
*H04B 10/00* (2006.01)

(52) U.S. Cl. .......................................... 398/33; 398/164

(58) Field of Classification Search ................ 398/9, 16, 398/22, 24–27, 33, 164
See application file for complete search history.

(56) References Cited

U.S. PATENT DOCUMENTS

| | | | |
|---|---|---|---|
| 7,065,038 B1 * | 6/2006 | Brandt et al. ................. | 370/219 |
| 2004/0142687 A1 * | 7/2004 | Richards et al. .............. | 455/423 |
| 2004/0258408 A1 * | 12/2004 | Ramaswami et al. .......... | 398/50 |

FOREIGN PATENT DOCUMENTS

EP 1 202 541 A2 5/2002

* cited by examiner

*Primary Examiner* — Dalzid Singh
(74) *Attorney, Agent, or Firm* — The Culbertson Group, P.C.

(57) ABSTRACT

The invention relates to a data transmission unit for high bit-rate optical data signals, in particular, high bit-rate optical data signals with a backplane, which has a line structure connecting several plug-in positions for several receiver or transceiver cards to each other and/or to one or more additional data processing cards, with the cards, each held in one of the plug-in positions and each having at least one input port for a high bit-rate data signal. Each card also has at least one output port, to which the relevant one or more high bit-rate data signals can be fed, and each of these output ports is connected via a serial data line between the plug-in position holding the relevant receiver or transceiver card and an input port of a central selection unit with the relevant input port. The output ports connect serially to the central selection unit.

16 Claims, No Drawings

DATA TRANSMISSION UNIT FOR HIGH BIT-RATE SIGNALS, ESPECIALLY HIGH BIT-RATE OPTICAL DATA SIGNALS GREATER THAN 1 GBIT/S

TECHNICAL FIELD OF THE INVENTION

The invention relates to a data transmission unit for high bit-rate data signals, especially high bit-rate optical data signals greater than 1 Gbit/s, with built-in testing features. In addition, the invention relates to a receiver or transceiver card for such a data transmission unit.

BACKGROUND OF THE INVENTION

In electrical and optical data networks, data errors sometimes occur. When such problems are identified, the data transmission unit realizing a network node or terminating a transmission path must be tested. Here, the testing is performed by conventional protocol testers, which must be connected to the relevant data transmission unit, in particular, the receiver or transceiver units, which can be constructed as receiver or transceiver cards.

In known data transmission units, when such a test is performed, the data traffic frequently must be interrupted, because the test device must be connected to a port that is typically connected for further processing of the high bit-rate data signal by means of downstream electronics.

Therefore, a "service time window," in which the relevant data traffic is shut down, must be provided by the operator of a data transmission network or a data transmission path. This usually takes place on the weekend and causes high administrative expense. In this "service time window," the connection of the test device, the measurement, and the disconnection of the test device can then be performed.

In addition, there is the possibility of allowing the test equipment to also be connected during operation after its installation within a "service time window" and to disconnect the test equipment again when the error leading to the negative effect on the data transmission quality is found. For this purpose, a "service time window" must be created and used again.

In the case of an optical transmission path or an optical data transmission network, it is further known to integrate, for example, at the reception location, an optical splitter into the optical transmission path, wherein test equipment can be connected to the free arm of the splitter. This has the disadvantage, however, that an operator of a network or a data transmission path must already have invested in providing such splitters when the system is set up, and these splitters may never be needed. In addition, such a splitter has the disadvantage of corresponding insertion attenuation in the transmission path.

Finally, it is known to perform electrical mirroring of a high bit-rate data signal on a still free terminal of an interface, for example, a receiver or transceiver card, that is, the identical high bit-rate data signal that was received and optionally prepared with respect to the clock and the signal form is fed to this free terminal or output port of an interface.

In this known solution, the test device can be connected at arbitrary times to the relevant free terminal or output port of the appropriate interface. In this case, interrupting the data traffic is not necessary.

Here, however, it is disadvantageous that a data transmission device for realizing a network node or an end point of a transmission path frequently has a backplane, which possesses several plug-in positions for holding interface cards, for example, receiver or transceiver cards. In the way described above, if a "test output part" is provided on each interface, then each input port of the test device must be connected directly to the relevant free terminal of each interface, wherein testing a plurality of high bit-rate data signals on various interface cards is associated with high costs.

SUMMARY OF THE INVENTION

The invention is based on the task of creating a data transmission unit for high bit-rate data signals, in particular, high bit-rate optical data signals, with a backplane and several plug-in positions for holding several interface cards, in which a simple connection of test equipment for testing the high bit-rate signals is possible. In addition, the invention is based on the task of creating a receiver or transceiver card that can be used for such a data transmission unit.

The invention works on the basis that the expense for performing tests for the high bit-rate data signals can be dramatically reduced if one of the high bit-rate data signals that are fed to the receiver or transceiver cards is passed transparently to a single output port. Each receiver or transceiver card has at least one output port to which the high bit-rate data signal or one of the high bit-rate data signals can be fed, wherein these signals are fed to the relevant receiver or transceiver card. There is a high-speed connection line between these output ports or between the relevant pins of the plug-in positions in which the receiver or transceiver cards are located and an input port of a central selection unit. The selection unit is here constructed so that, in a controlled way, it transparently passes the high bit-rate signal fed to one of its input ports to a single output port. Thus it is possible to also feed high bit-rate electrical data signals in a controllable (and selectable) way from several receiver or transceiver cards each via a signal path to the backplane of a selection unit, wherein this unit advantageously passes one of the high bit-rate data signals transparently to an output port.

Here, a receiver or transceiver card can have only a single input port, to which a (single) high bit-rate (receive) data signal is fed. Obviously, however, a receiver or transceiver card can also have several input ports, wherein each one of the high bit-rate data signals fed to these input ports is fed to an associated output port. In this case, each of the several output ports is connected to an input port of the central selection unit via connection lines between the relevant pin of the plug-in position in which the receiver or transceiver card is held.

Finally, a receiver or transceiver card can also have several input ports and only one output port, wherein, here, one or the received high bit-rate data signals can be fed to the single output port in a controllable way.

A (receive) data signal can be fed to a corresponding output port in a known way by "mirroring" the relevant electrical signal.

According to one implementation of the invention, the one or more high bit-rate data signals fed to one of the receiver or transceiver cards can be an optical data signal. In this case, a unit for the optoelectrical conversion of the high bit-rate data signal is connected downstream of each receive port of the receiver or transceiver card.

According to the invention, the selection unit can be either arranged fixed on the backplane or provided similarly on an interface card that is held in a plug-in position.

The central selection unit can also comprise a signal processing circuit which compensates for negative effects on the signal in the transmission of the relevant signal between the output port of the relevant receiver or transceiver card and the relevant input port of the selection unit.

In addition, the selection unit can be integrated with a signal processing unit, which can perform, for example, a protocol test with respect to the signal fed to it or some other kind of test on the signal.

According to one construction of the invention, the central selection unit can be constructed as a switch.

According to one preferred embodiment of the invention, the output ports of the receiver or transceiver cards and/or the input ports and/or the output port of the central selection unit can be formed by high-speed interfaces of a field programmable gate array (FPGA). In this way, it is possible also advantageously to switch through high bit-rate signals of at least 1 Gbit/s transparently via the backplane to the output of the selection unit.

A corresponding FPGA can simultaneously also perform the mirroring of each electrical signal to the output port of a receiver or transceiver card. Such an FPGA can obviously also perform additional or practically all of the processing steps realized on a receiver or transceiver card, so that the FPGA is practically the only essentially active component on such a card.

Additional embodiments of the invention result from the subordinate claims and the detailed description and drawing below.

The invention will be explained below with reference to an embodiment shown in the drawing.

BRIEF DESCRIPTION OF THE DRAWINGS

The single FIGURE shows a schematic block diagram of a data transmission unit according to the invention.

DETAILED DESCRIPTION OF PREFERRED EMBODIMENT

The data transmission unit 1 shown in the FIGURE comprises a backplane 3, which can be constructed, for example, as a printed-circuit board. On the backplane 3 there are several plug-in positions 5, 7, and 9 each for a receiver or transceiver card 11, 13, 15.

Each plug-in position 5, 7, 9 can be realized by a plug-in bar 5a, 7a, 9a, in which a plug-in contact region 11a, 13a, 15a of the relevant receiver or transceiver card 11, 13, 15 is held.

Each receiver or transceiver card 11, 13, 15 has, in the embodiment shown in the single FIGURE, two input ports 11b, 13b, 15b, to each of which a high bit-rate signal is fed. The high bit-rate signals can be fed electrically or in the form of optical signals, wherein, in this case, an optical waveguide is connected to the relevant input port 11b, 13b, 15b.

On each receiver or transceiver card, an FPGA 17, 19, 21 is provided, by which means essentially all of the necessary steps for signal processing and signal processing are realized on the corresponding receiver or transceiver card 11, 13, 15.

In the shown embodiment, the FPGAs 17, 19, 21 take over, among other things, the function of mirroring one of the high bit-rate data signals received on the input port 11b, 13b, 15b (optionally after optoelectrical conversion) to an output port 11c, 13c, 15c of the receiver or transceiver cards 11, 13, 15. For this (controllable) mirroring function, absolutely no interruption of the transmission path is necessary.

Because the output ports 11c, 13c, 15c are each connected to the relevant connection pin of the corresponding plug-in bar 5a, 7a, 9a, the relevant mirrored, high bit-rate data signal can be fed by means of each serial connection line 29, 31, 33 to an input port 23a of a central selection unit 23. The central selection unit 23 is similarly held in a plug-in position 25, which is realized by a plug-in bar 25a.

The central selection unit 23 is constructed in the shown embodiment as a standalone interface card. However, this can also be obviously integrated rigidly onto the backplane 3.

The central selection unit 23 can similarly have an FPGA 27, which takes over practically all of the processing steps required on the interface card or in the central selection unit 23 for the supplied high bit-rate data signals. In particular, by means of this FPGA, a high-speed interface can be realized for each data signal fed to an input port 23a.

The serial connection lines 29, 31, 33 can each be realized in a known way by means of two lines, over which the relevant high bit-rate data signal is transmitted as a differential signal.

The central selection unit 23 switches, in a controlled way, one of the high bit-rate data signals fed to an input port 23a to an output port 23b. The output port 23b can be connected, as shown in the FIGURE, to an output port 35 of the backplane 3. This output port 35 is then used for connecting test equipment, for example, a protocol tester (not shown).

As already mentioned, the passing one of the high bit-rate data signals supplied to an input port 23a to the output port 23b is performed advantageously transparently, so that on the output port 35 a data signal is applied that is identical (with respect to its data) to the high bit-rate data signals received at one of the input ports 11b, 13b, 15b.

In the shown embodiment, the FPGA 17, 19, 21 of the receiver or transceiver card 11, 13, mirrors one of the high bit-rate data signals received on one of the input ports 11b, 13b, 15b in a controllable (and selectable) way to the relevant output port 11c, 13c, 15c. One of these mirrored electrical signals can then be switched through by means of the central selection unit 23, which can also be realized as a switch, to the output port 35 of the backplane 3.

Obviously, (not shown) control signals, which are fed to the central selection unit 23 or to the receiver or transceiver cards 11, 13, 15, can be fed to the backplane 3 shown in the FIGURE. Through a corresponding evaluation of these control signals by the FPGA 17, 19, 21, or 27 then each selected input port 11b, 13b, 15b is switched through to the output port 11c, 13c, 15c or the relevant input port 23a to the output port 23b.

The central selection unit 23 or the FPGA 27 advantageously comprises a signal processing circuit (not shown), which processes the high bit-rate data signals fed to the input port 23a, in particular, in order to compensate for negative effects on these signals during transmission via the serial connection lines 29, 31, 23.

Here, such a circuit for signal processing can be assigned to each of the input ports 23a or all of the input ports 23a together, wherein each performs only the signal processing of the current, transparently switched-through high bit-rate data signal.

It is possible in this way to transmit the high bit-rate data signals not only within highly integrated circuits, for example, the FPGA 17, 19, 21 or 27, but also via the relatively long, serial connection lines 29, 31, 33.

The data transmission unit 1 according to the invention thus allows the simple connection of a (not shown) unit for testing one of the high bit-rate signals fed to the data transmission unit 1 on the output port 35.

The above described preferred embodiments are intended to illustrate the principles of the invention, but not to limit the scope of the invention. Various other embodiments and modifications to these preferred embodiments may be made by those skilled in the art without departing from the scope of the present invention.

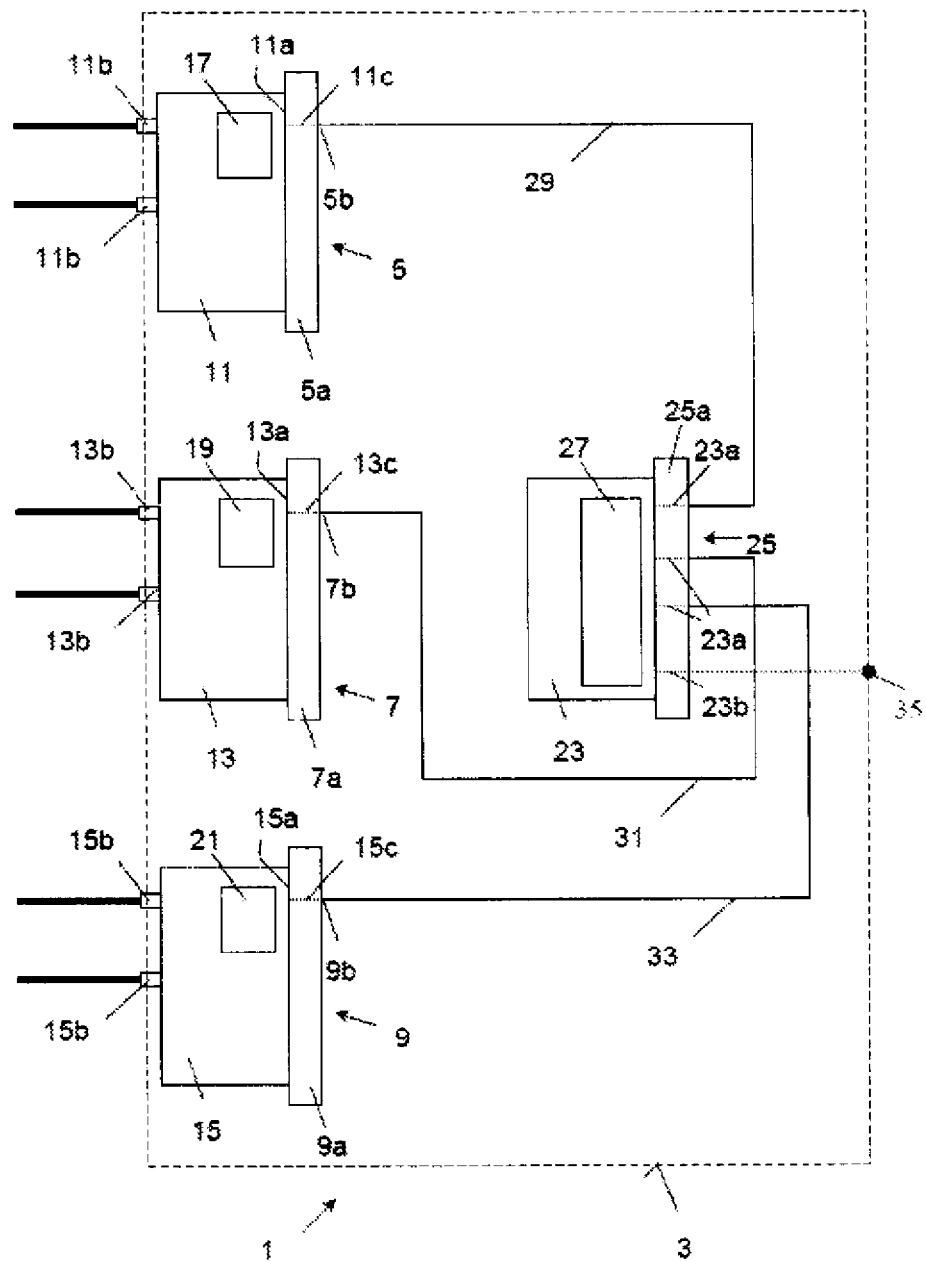

The invention claimed is:

1. A data transmission device for high bit-rate data optical signals, especially high bit-rate optical data signals greater than 1 Gbit/s, the device comprising:
   (a) a backplane, which has a line structure adapted to connect several plug-in positions for several receiver and transceiver cards to each other or to at least one other data processing card;
   (b) a plurality of receiver and transceiver cards, which are each held in one of the plug-in positions and which each have at least one input port each adapted to connect to a high bit-rate optical data signal, each of the high bit-rate optical data signals being generated by
      (i) optical-electrical conversion of a corresponding high bit-rate optical data signal received at the at least one in put port into a high bit rate electrical data signal, and
      (ii) subsequent electrical identical reproduction of the high bit-rate electrical data signal onto the at least one output port;
   (c) a central selection unit connected to the backplane and having a plurality of input ports;
   (d) wherein each of the receiver and transceiver cards has at least one output port, to which the relevant high bit-rate data signals can be fed, the output port being connected via a serial data line between the plug-in position holding the respective receiver and transceiver card and a respective one of the input ports of the central selection unit; and
   (e) wherein the central selection unit has an output port to which one of the high bit-rate data signals can be fed in a controllable way.

2. The data transmission device of claim 1, wherein the at least one high bit-rate data signal input port of the receiver and transceiver cards is adapted to receive a high bit-rate optical data signal and wherein the receiver and transceiver cards are each adapted to opto-electrically convert these data signals and feed them to respective output ports.

3. The data transmission device of claim 1, wherein the central selection unit is arranged fixed on the backplane.

4. The data transmission device of claim 1, wherein the central selection unit is adapted to be held in a plug-in position.

5. The data transmission device of claim 1, wherein the central selection unit has a signal processing circuit, which compensates for negative effects on the relevant high bit-rate data signal during the transmission of the signal between the respective output port of the respective receiver and transceiver card and a respective input port of the central selection unit.

6. The data transmission device of claim 1, wherein the central selection unit is constructed with an integrated signal evaluation unit.

7. The data transmission device of claim 1, wherein the integrated signal evaluation unit is constructed as a switch.

8. The data transmission device of claim 1, wherein the output ports of the receiver and transceiver cards and the input ports of the central selection unit are formed by high-speed interfaces of a field programmable gate array.

9. A receiver and transceiver card for a data transmission unit for high bit-rate data signals, the receiver and transceiver card comprising:
   (a) a card adapted to be held in a plug-in position of a backplane;
   (b) at least one input port on the card adapted to connect to a high bit-rate data signal;
   (c) at least one output port on the card, to which the high bit-rate data signal can be optoelectrically converted and fed by the card, the output port being adapted to connect, via a serial data line from the plug-in position holding the respective receiver and transceiver card, to an input port of a central selection unit connected to the backplane and adapted to controllably connect the high bit-rate signal to an external port of the backplane for testing purposes; and
   (d) wherein the output port to which at least one of the optoelectrically converted data signals is fed is assigned to at least one pin of a connection contact bar.

10. The receiver and transceiver card of claim 9, wherein the output ports of the receiver and transceiver card are formed by a high-speed interface of a field programmable gate array.

11. Means for testing a plurality of receiver and transceiver cards at a network node, the means comprising:
   (a) a backplane with several plug-in position means for holding several transceiver and receiver cards of a network node;
   (b) serial connection means for serially connecting an identical electrical reproduction of a received high bit-rate data signal from each of the plug-in position means to a central selection unit means; and
   (c) said central selection unit means for controllably connecting the identical electrical reproduction of selected one of the high bit-rate signal to an external port of the backplane for testing the received signal for errors.

12. The testing means of claim 11, wherein the central selection unit means include a field programmable gate array on the transceiver and receiver cards.

13. The testing means of claim 11, further comprising opto-electrical conversion means on the transceiver and receiver cards.

14. The testing means of claim 11, wherein the central selection unit means is connected to the backplane with a plug.

15. The testing means of claim 11, wherein the central selection unit means is fixed to the backplane as part of an integrated unit.

16. The testing means of claim 11, wherein the central selection unit further comprises integrated signal evaluation means for evaluating a selected signal received from the serial connection means.

* * * * *

UNITED STATES PATENT AND TRADEMARK OFFICE
CERTIFICATE OF CORRECTION

| | | |
|---|---|---|
| PATENT NO. | : 8,036,528 B2 | |
| APPLICATION NO. | : 12/112372 | |
| DATED | : October 11, 2011 | |
| INVENTOR(S) | : Mirko Lawin | |

It is certified that error appears in the above-identified patent and that said Letters Patent is hereby corrected as shown below:

At the Title page, last line: change "16 Claims, No Drawings" to read --16 Claims, 1 Drawing--.

In the drawing: Insert the drawing attached hereto.

At column 4, line 27: change "transceiver card 11, 13, mirrors" to read --transceiver card 11, 13, 15 mirrors--.

Signed and Sealed this
Sixth Day of December, 2011

David J. Kappos
*Director of the United States Patent and Trademark Office*

(12) United States Patent
Lawin

(10) Patent No.: US 8,036,528 B2
(45) Date of Patent: Oct. 11, 2011

(54) DATA TRANSMISSION UNIT FOR HIGH BIT-RATE SIGNALS, ESPECIALLY HIGH BIT-RATE OPTICAL DATA SIGNALS GREATER THAN 1 GBIT/S

(75) Inventor: Mirko Lawin, Meiningen (DE)

(73) Assignee: ADVA AG Optical Networking, Meiningen (DE)

( * ) Notice: Subject to any disclaimer, the term of this patent is extended or adjusted under 35 U.S.C. 154(b) by 708 days.

(21) Appl. No.: 12/112,372

(22) Filed: Apr. 30, 2008

(65) Prior Publication Data
US 2008/0267636 A1 Oct. 30, 2008

(30) Foreign Application Priority Data
Apr. 30, 2007 (DE) .................. 10 2007 020 661

(51) Int. Cl.
*H04B 10/08* (2006.01)
*H04B 10/00* (2006.01)
(52) U.S. Cl. ........................................ 398/33; 398/164
(58) Field of Classification Search ............ 398/9, 16, 398/22, 24–27, 33, 164
See application file for complete search history.

(56) References Cited

U.S. PATENT DOCUMENTS

| | | |
|---|---|---|
| 7,065,038 B1 * | 6/2006 | Brandt et al. .......... 370/219 |
| 2004/0142687 A1 * | 7/2004 | Richards et al. ........ 455/423 |
| 2004/0258408 A1 * | 12/2004 | Ramaswami et al. ..... 398/50 |

FOREIGN PATENT DOCUMENTS
EP 1 202 541 A2 5/2002

* cited by examiner

*Primary Examiner* — Dalzid Singh
(74) *Attorney, Agent, or Firm* — The Culbertson Group, P.C.

(57) ABSTRACT

The invention relates to a data transmission unit for high bit-rate optical data signals, in particular, high bit-rate optical data signals with a backplane, which has a line structure connecting several plug-in positions for several receiver or transceiver cards to each other and/or to one or more additional data processing cards, with the cards, each held in one of the plug-in positions and each having at least one input port for a high bit-rate data signal. Each card also has at least one output port, to which the relevant one or more high bit-rate data signals can be fed, and each of these output ports is connected via a serial data line between the plug-in position holding the relevant receiver or transceiver card and an input port of a central selection unit with the relevant input port. The output ports connect serially to the central selection unit.

16 Claims, 1 Drawing